(12) United States Patent
Yoon et al.

(10) Patent No.: US 8,296,487 B1
(45) Date of Patent: *Oct. 23, 2012

(54) SATA PASS THROUGH PORT

(75) Inventors: Tony Yoon, Cupertino, CA (US); Chi Kong Lee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,040

(22) Filed: Mar. 13, 2012

Related U.S. Application Data

(63) Continuation of application No. 12/543,335, filed on Aug. 18, 2009, now Pat. No. 8,140,724.

(60) Provisional application No. 61/091,276, filed on Aug. 22, 2008.

(51) Int. Cl.
*G06F 13/12* (2006.01)
(52) U.S. Cl. .......................................... 710/74; 710/313
(58) Field of Classification Search .................. None
See application file for complete search history.

(56) References Cited

U.S. PATENT DOCUMENTS

| | | | |
|---|---|---|---|
| 6,976,105 B1 | 12/2005 | Wright | |
| 7,765,339 B2 | 7/2010 | Salessi et al. | |
| 2005/0033885 A1 | 2/2005 | Nakayama et al. | |
| 2006/0168358 A1 | 7/2006 | Liang et al. | |
| 2007/0162626 A1 | 7/2007 | Iyer et al. | |

OTHER PUBLICATIONS

Fouli, A.R.; El-Kharashi, M.W.; El-Henawy, H.M.; , "Serial ATA Host Controller: A Hardware Implementation," System-on-Chip for Real-Time Applications, The 6th International Workshop on , vol., no., pp. 45-49, Dec. 2006 URL: http://ieeexplore.ieee.org/stamp/stamp.jsp?tp=&arnumber=4155258&isnumber=4155237.*
Jian Liang; Swaminathan, S.; Tessier, R.; , "ASOC: a scalable, single-chip communications architecture," Parallel Architectures and Compilation Techniques, 2000. Proceedings. International Conference on , vol., no., pp. 37-46, 2000 URL: http://ieeexplore.ieee.org/stamp/stamp.jsp?tp=&arnumber=888329&isnumber=19206.*
Wei Wu; Hai-bing Su; Qin-zhang Wu; , "Implementing a Serial ATA Controller Base on FPGA," Computational Intelligence and Design, 2009. ISCID '09. Second International Symposium on , vol. 1, no., pp. 467-470, Dec. 12-14, 2009 URL: http://ieeexplore.ieee.org/stamp/stamp.jsp?tp=&arnumber=5368900&isnumber=5368739.*

(Continued)

*Primary Examiner* — Chun-Kuan Lee
*Assistant Examiner* — Dayton Lewis-Taylor

(57) ABSTRACT

A first storage controller includes a first memory controller, a first interface controller, and a second interface controller. The first memory controller is configured to control a connection between the first storage controller and a first storage device. The first interface controller is configured as a device, and is configured to control a connection between the first storage controller and a first host. The second interface controller is configurable to function as a host or a device. The second interface controller is configured to control a connection between the first storage controller and a secondary device, function as a host when the secondary device is a second storage controller, and function as a device when the secondary device is a second host.

18 Claims, 9 Drawing Sheets

OTHER PUBLICATIONS

Fouli, A.R.; El-Kharashi, M.W.; El-Henawy, H.M.;, "Serial ATA Host Controller: A Hardware Implementation," System-on-Chip for Real-Time Applications, The 6th International Workshop on, vol., no., pp. 45-49, Dec. 2006, URL: http://ieeexplore.ieee.org/stamp/stamp.jsp?tp=&arnumber=4155258&isnumber=4155237.

Jian Liang; Swaminathan, S.; Tessier, R.;, "ASOC: a scalable, single-chip communications architecture," Parallel Architectures and Compilation Techniques, 2000. Proceedings. International Conference on, vol., no., pp. 37-46, 2000 URL: http://ieeexplore.ieee.org/stamp/stamp.jsp?tp=&arnumber=888329&isnumber=19206.

Wei Wu; Hai-bing Su; Qin-zhang Wu;, "Implementing a Serial ATA Controller Base on FPGA," Computational Intelligence and Design, 2009. I SCI D '09. Second International Symposium on, vol. 1, no., pp. 467-470, Dec. 12-14, 2009, URL: http://ieeexplore.ieee.org/stamp/stamp.jsp?tp=&arnumber=5368900&isnumber=5368739.

* cited by examiner

SATA PASS THROUGH PORT

CROSS-REFERENCE TO RELATED APPLICATIONS

This application is a continuation of U.S. patent application Ser. No. 12/543,335 filed on Aug. 18, 2009, which claims the benefit of U.S. Provisional Application No. 61/091,276, filed on Aug. 22, 2008. The disclosures of the above applications are incorporated herein by reference in their entirety.

FIELD

Aspects of the present invention relate generally to the field of disk drives and interfaces, and more particularly to a hybrid controller capable of coupling multiple host and memory devices.

BACKGROUND

In the context of computing systems, a conventional controller connects two devices and generally arbitrates, or controls, how the two devices interact. In common computing systems, a controller often connects a host computer or adapter with a data storage or memory device. For example, a controller may connect the host computer to a dynamic Random Access Memory (DRAM) or to a Flash memory device. In particular, a typical controller may function as an adapter that enables connection of a single external device to the host computer.

There are presently many different types of external memory, including several variations of DRAM, static RAM (SRAM), synchronous DRAM (SDRAM), and Flash memory, and various mass storage memory devices, including hard disk drives and solid-state drives. Solid-state drives are increasingly becoming affordable and more prevalent in computing systems. In some circumstances, therefore, it may be desirable to provide a hybrid controller in order to accommodate and utilize the various types of memory potentially available in a given computing system.

SUMMARY

Embodiments of the present invention overcome the above-mentioned and various other shortcomings of conventional technology, by providing a hybrid controller for coupling a plurality of host and memory devices. A method of coupling a plurality of memory and host devices with a single hybrid controller is also provided. In one embodiment, a host may be coupled to a primary memory and a secondary device via a first and second interface controller respectively. Each interface controller may be configurable as a host or as a device. In one embodiment, multiple interface controllers may be used to couple the host device to additional secondary devices, or to couple multiple host devices to a memory device creating a dual port interface with multiple hosts. The interface controllers' access to data across coupled devices may be arbitrated with a buffer manager.

BRIEF DESCRIPTION OF DRAWINGS

The present invention is described herein with reference to the accompanying drawings, in which similar reference numbers are used to indicate functionally similar elements. The foregoing and other aspects of various embodiments of the present invention will be apparent through examination of the following detailed description thereof in conjunction with the accompanying drawing figures in which similar reference numbers are used to indicate functionally similar elements.

DESCRIPTION

Figure 1:
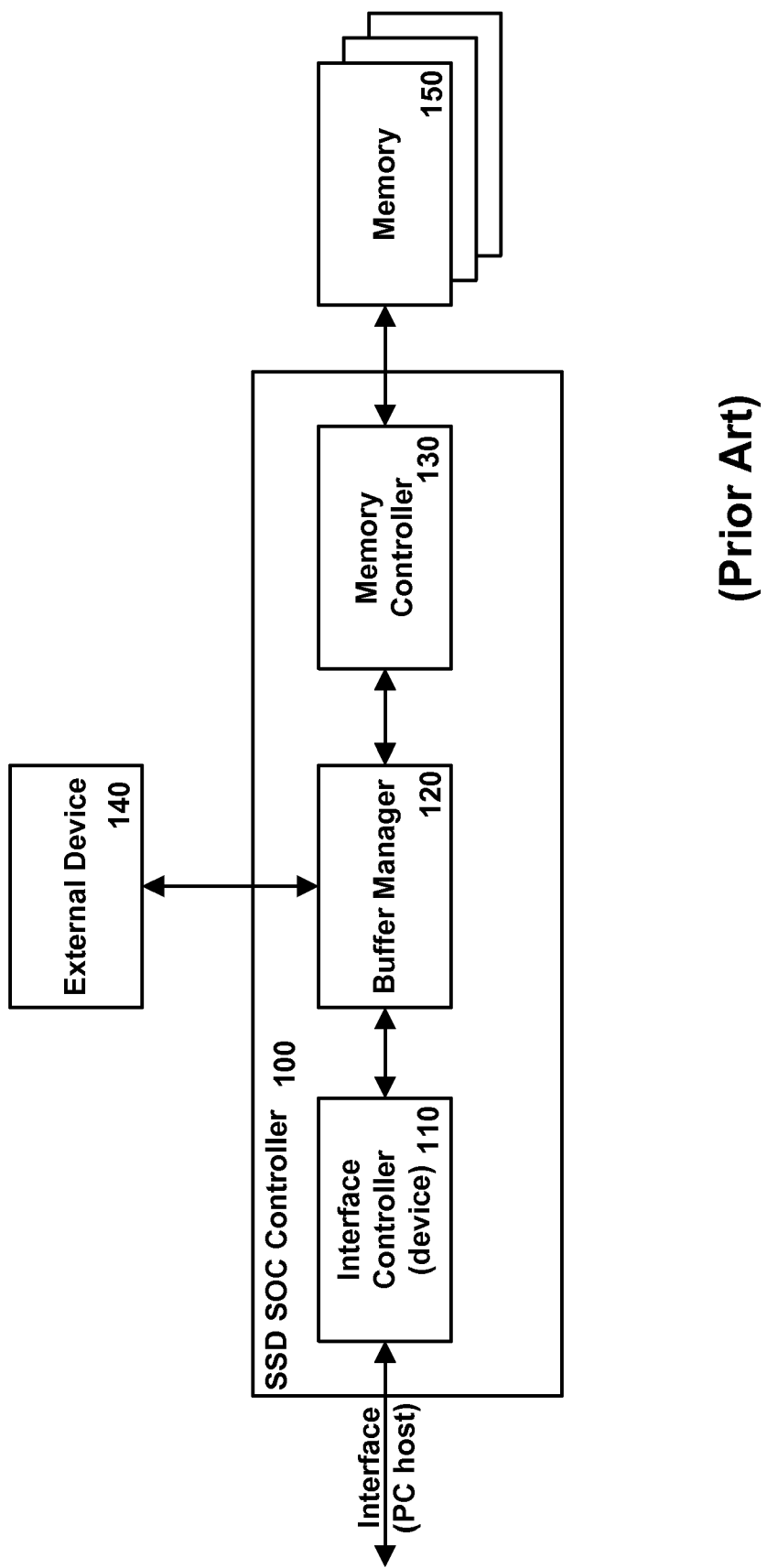
FIG. 1 shows a conventional controller for a solid-state drive (SSD).

FIG. 1 illustrates a conventional controller for a solid-state drive (SSD) system. This SSD system-on-a-chip (SOC) controller 100 as shown connects, controls the interfaces between, and manages communication between a PC host (not shown), an external device 140 that may be embodied as a double data rate (DDR) SDRAM device and a memory device 150 that may be embodied as a flash memory device. In that regard, SOC controller 100 generally comprises a first interface controller 110, a buffer manager 120, and a memory controller 130. System-on-a-chip devices are typically designed such that the components of a functional system are integrated onto a single integrated circuit or single chip. Accordingly, as depicted in FIG. 1, the elements of SOC controller 100 may be included on a single chip.

In use, SOC controller 100 may connect a PC host or adapter (not shown) to a single memory device 150. Data can be written from the host to memory device 150 and read from memory device 150 by the host. In some implementations, memory device 150 may be a solid-state drive (SSD) that interfaces with SOC controller 100 via an SSD controller. For example, memory device 150 may be embodied in or comprise a flash memory device, such as a NAND flash storage device or other type of SSD, and memory controller 130 may serve as an SSD controller. In an alternative embodiment of SOC controller 100, the PC host may be coupled to a hard disk drive (HDD) that interfaces with SOC controller 100 via an HDD controller.

In some implementations, SOC controller 100 may be connected to the PC host via a Serial Advanced Technology Attachment (SATA) interface managed by first interface controller 110. However, first interface controller 110 may be operable in accordance with any suitable interface protocols and interface controller hardware that can manage the connection with the PC host; it will be appreciated that various alternatives exist, and that such alternatives may be application or hardware specific. For example, the PC host may be coupled to SOC controller 100 via a Peripheral Component Interconnect Express (PCIE) connection, a Small Computer System Interface (SCSI) connection, or a Serial Attached SCSI (SAS) connection.

Figure 2:
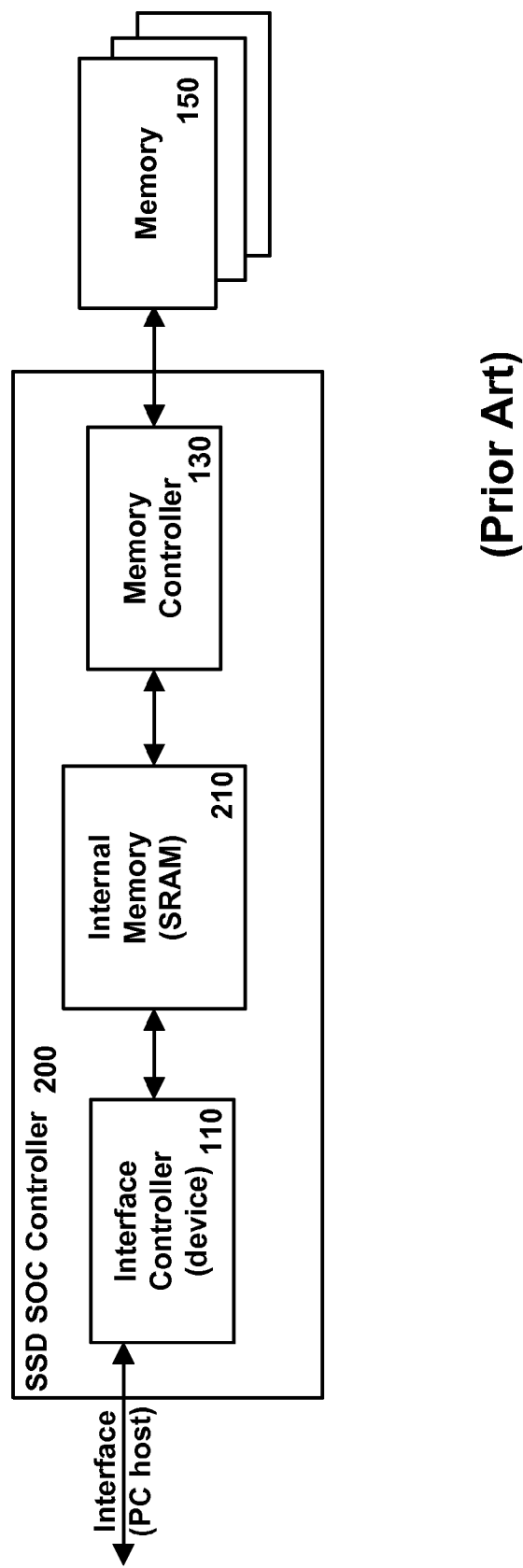
FIG. 2 shows a conventional SSD controller with an internal memory.

First interface controller 110 can be further coupled to buffer manager 120 which may act as an arbitrator, routing communications between the different clients and interface controllers in SOC controller 100. Buffer manager 120 may also control an interface to external device 140 or otherwise generate signals to enable or to facilitate bi-directional communication with an external device. External device 140 may be a double-data-rate synchronous dynamic random access memory (DDR SDRAM) device, or any external memory, for example, DRAM, SRAM, or other types of memory. In some systems, external device 140 may also function as a cache memory for the PC host. Buffer manager 120 may additionally be coupled to memory controller 130 that can manage an interface to memory device 150. In the alternative arrangement shown in FIG. 2, external device 140 and buffer manager 120 may be replaced in some situations with an internal memory 210 as part of SOC controller 200. However, the conventional controllers illustrated in FIGS. 1 and 2 are generally otherwise limited with respect to the number and type of interfaces available for implementation in a single SOC solution.

Figure 3:
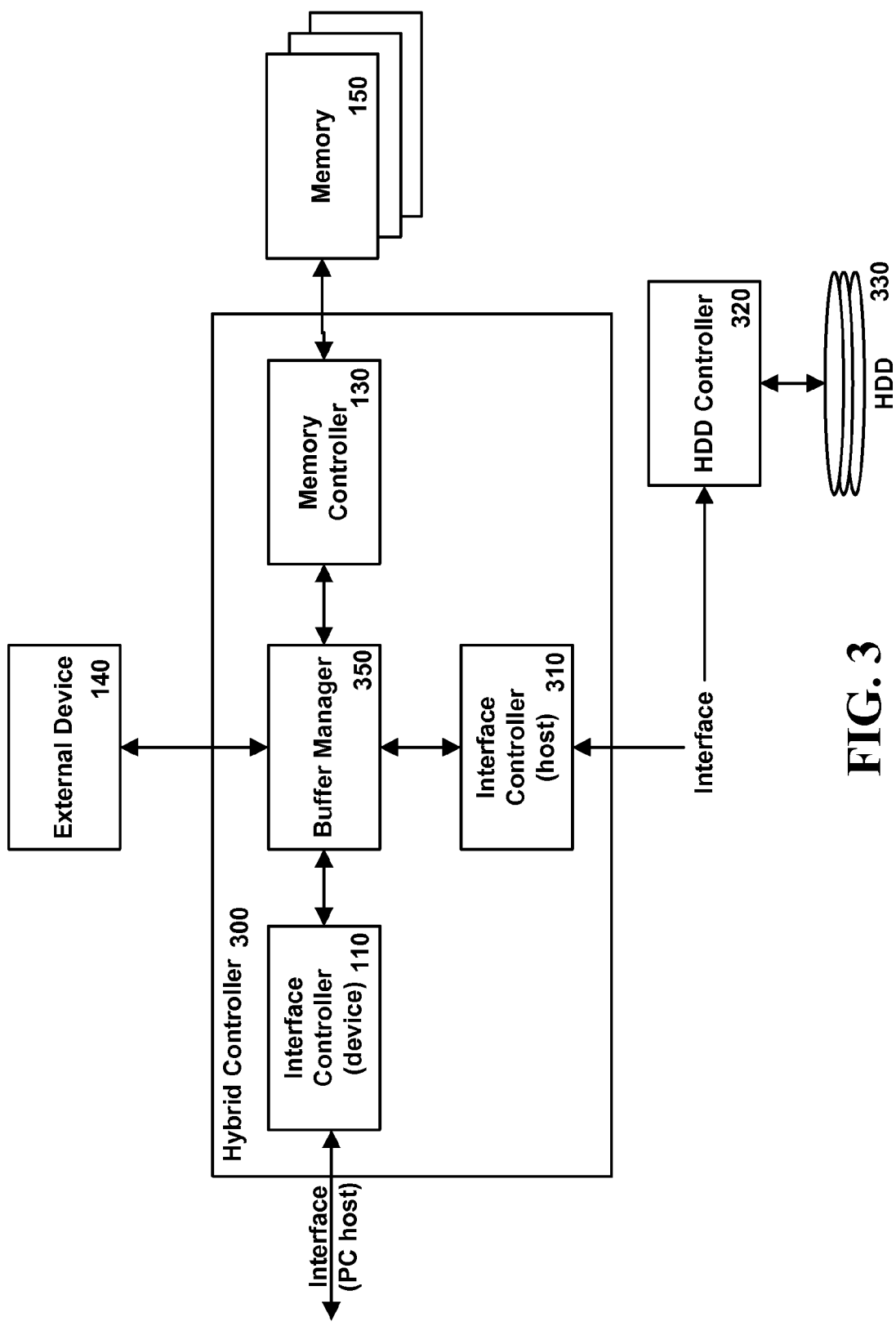
FIG. 3 is a simplified high level block diagram illustrating one embodiment of a hybrid controller to couple a host device with both a solid-state drive (SSD) and a hard disk drive (HDD).

FIG. 3 is a simplified high level block diagram illustrating one embodiment of a hybrid controller to couple a host device with both a solid-state drive (SSD) and a hard disk drive (HDD). In the illustrated embodiment, hybrid controller 300 can maintain all of the original connections and options provided in the conventional SOC controller 100 of FIG. 1, but with the flexibility to add new interfaces as set forth below. Hybrid controller 300 may still connect a PC host or adapter (not shown) to memory device 150, where memory device 150 may be for example an SSD, HDD, or Flash storage device. However, hybrid controller 300 can additionally allow for multiple interfaces and interface controllers, and each additional interface may connect hybrid controller 300 to a secondary device. One interface may connect hybrid controller 300 to a PC host or adapter via first interface controller 110 as before. In addition, a second interface controller 310 configured as a host, may couple hybrid controller 300 via another interface to another controller, shown in FIG. 3 as an HDD controller 320. Hybrid controller 300 may be coupled to the PC host via a SATA interface, and hybrid controller 300 may be coupled to external HDD controller 320 via an external SATA (eSATA) interface. However, as previously noted, first interface controller 110 and second interface controller 310 may be operable in accordance with any suitable interface protocols and interface controller hardware that can manage the connection with the PC host and with HDD controller 320 respectively.

As further explained below, where second interface controller 310 is configured as a host, it may manage the interface and facilitate communication of data between hybrid controller 300 and an external device, in this case, HDD controller 320. This configuration may enable the PC host to communicate with any number of drives or other devices that may be managed by a suitable or compatible controller. For example, as shown in FIG. 3, second interface controller 310 may be coupled to HDD controller 320, allowing communication and information exchange between any of memory device 150 (e.g., a NAND flash memory), a PC host, external device 140 (e.g., a DDR SDRAM), and hard disk drive 330. This hardware arrangement may be considered a pass through port because the data are passing through hybrid controller 300, from the PC host to the newly connected drive or other component (i.e., HDD 330) by way of second interface controller 310.

In the conventional SOC controller 100 shown in FIG. 1, buffer manager 120 is coupled only to two controllers: first interface controller 110 and memory controller 130. In an embodiment of hybrid controller 300, however, an additional coupling between buffer manager 350 and second interface controller 310 may be provided. In some embodiments, this coupling may be similar to the original coupling between buffer manager 120 and first interface controller 110, though this need not be the case. For example, the coupling between buffer manager 350 and second interface controller 310 may be implemented with a duplication of the interface and the logic already existent in buffer manager 120 and adding another client to the buffer manager's routines. As an alternative, different hardware logic implementing different communications protocols may be employed, depending upon the nature and operational characteristics of HDD controller 320 to which second interface controller 310 is to be coupled.

Figure 4:
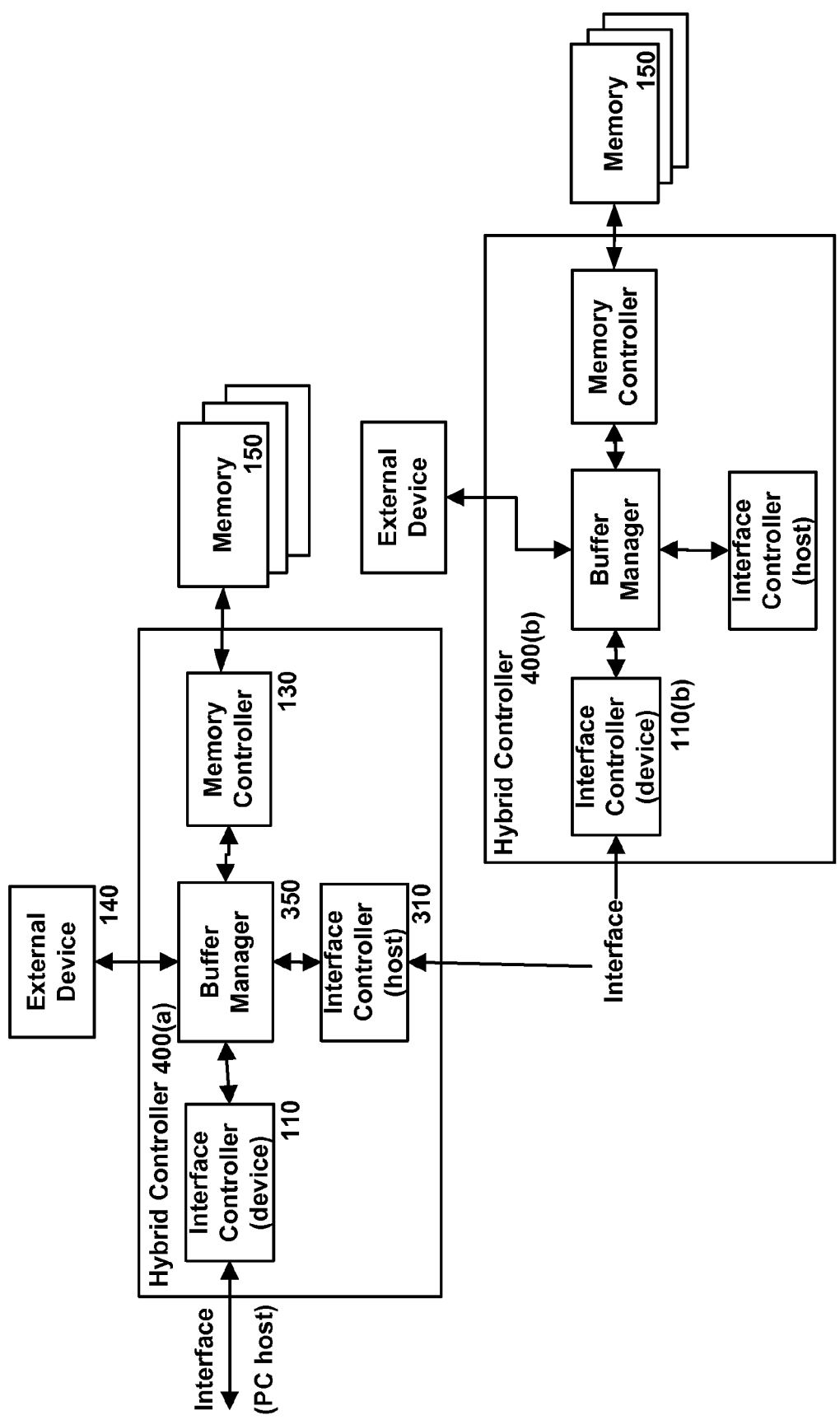
FIG. 4 shows one embodiment of a computing system comprising two hybrid controllers.

In an embodiment shown in FIG. 4, a second interface controller 310 may be coupled to a second hybrid controller 400(b). As shown in FIG. 4, second hybrid controller 400(b) may be substantially similar to the first hybrid controller 400(a). The first interface controller 110(b) of the second hybrid controller 400(b) may be configured as a device and connected to the second interface controller 310 of the first hybrid controller 400(a) where the second interface controller 310 may be configured as a host. Such an arrangement can create a cascading effect that may provide for expanding the capacity of the PC host. The cascading effect may continue as capacity demands, connecting the second hybrid controller 400(b) to a third hybrid controller (not shown) which in turn may be connected to a fourth hybrid controller (not shown) and so on.

Second interface controller 310 may be configurable to act as a host or as a device. An end user may be given the option to set the second interface controller 310 as either a host or a device as needed. A host is generally configured to manage the interface and to facilitate the communication of data between the controller and an external device. For example, second interface controller 310 configured as a host could manage the connection between hybrid controller 400(a) and hybrid controller 400(b) which may be configured as a device. As in an embodiment shown in FIG. 3, second interface controller 310 configured as a host may connect with a device (e.g. HDD controller 320); as in the FIG. 4 embodiment, however, the "device" can be another hybrid controller (e.g., hybrid controller 400(b)) configured as a device similar to HDD controller 320 of FIG. 3. When second interface controller 310 is configured to act as a host, the connected device controller may be any compatible device controller.

Where second interface controller 310 is configured as a device, on the other hand, second interface controller 310 may communicate with a host. Communication with a host may suggest that second interface controller 310 can receive commands and take suitable or appropriate actions responsive to requests issued by the host. In that regard, second interface controller 310 may perform as if it were a "slave" device to the host. Second interface controller 310 configured as a device may manage and respond to read and write requests, for instance, directed to a memory device and sent by a PC host. As shown in FIG. 3, first interface controller 110 may also be configured as a device and can be coupled to a host.

Figure 5:
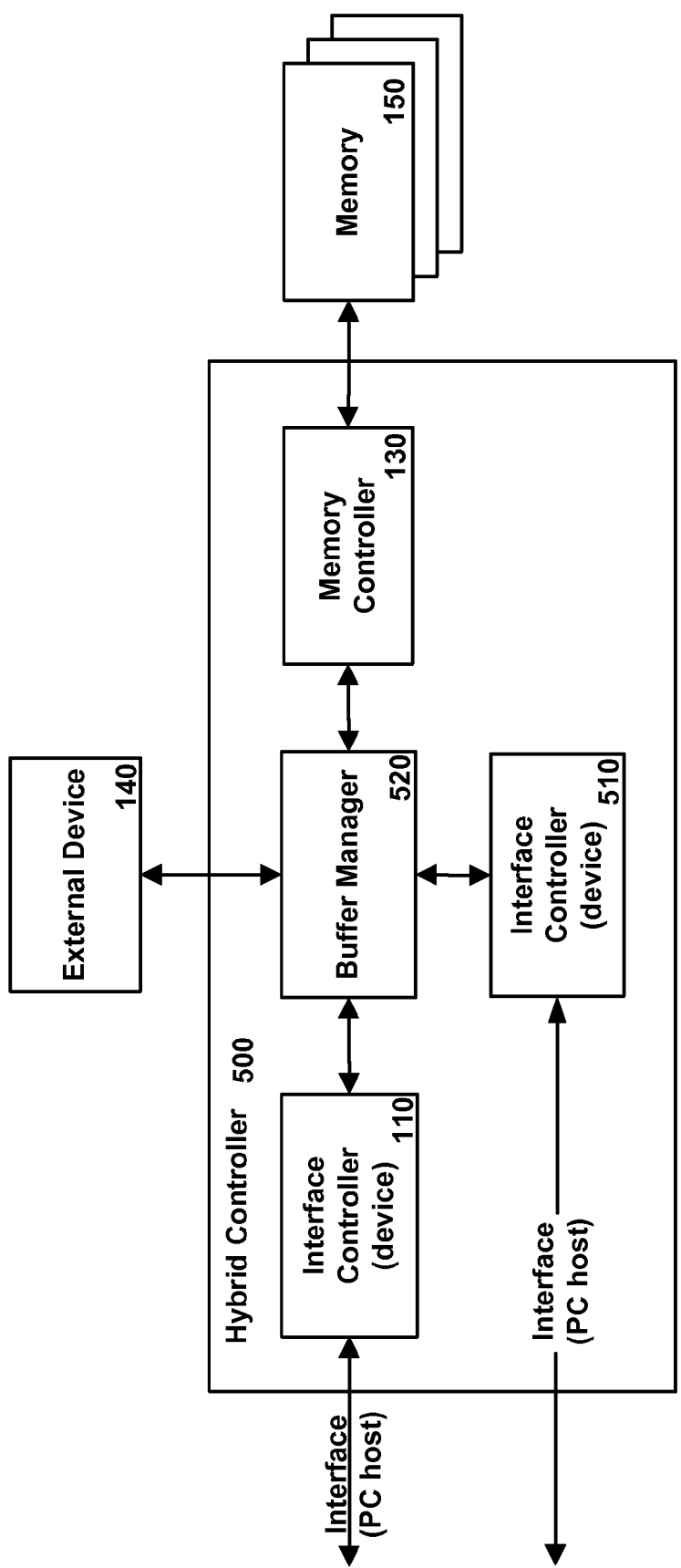
FIG. 5 shows one embodiment of a dual port hybrid controller.

FIG. 4 shows one embodiment of a computing system comprising two hybrid controllers. In FIG. 4, interface controller 110(b) is configured as a device and is coupled to second interface controller 310 configured as a host. The first hybrid controller 400(a) performs as if it were a host to the device embodied by the second hybrid controller 400(b). As illustrated in an embodiment depicted in FIG. 5, where hybrid controller 500 has a second interface controller 510 coupled to a buffer manager 520, and where second interface controller 510 is configured as a device, hybrid controller 500 may have a dual port connection that can couple hybrid controller 500 to an additional PC host.

Figure 6:
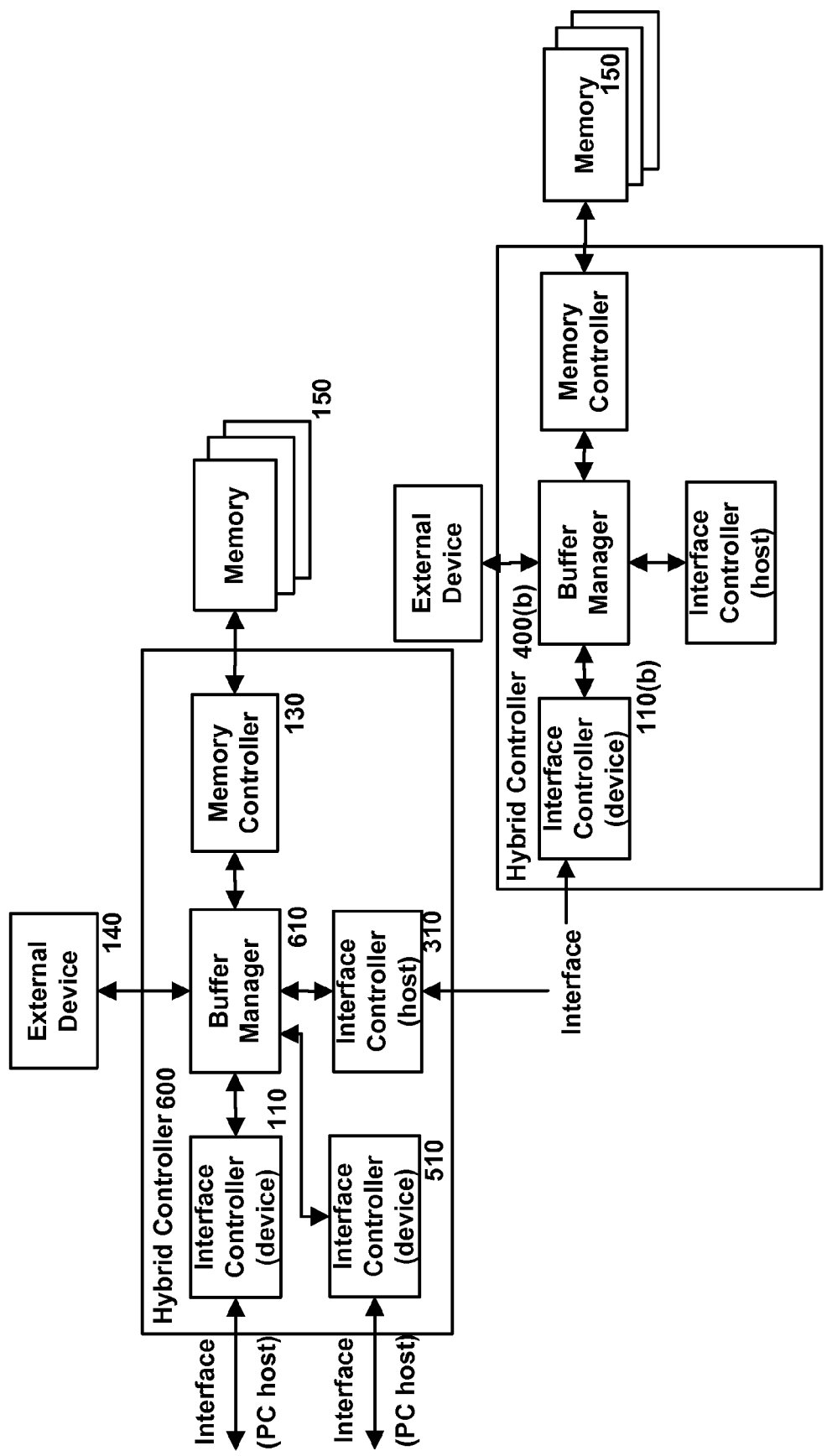
FIG. 6 shows one embodiment of a hybrid controller having serial connections configured as both a host interface and as a device interface.

In some implementations, a hybrid controller may further contain additional interfaces. For example, FIG. 6 shows one embodiment of a hybrid controller having serial connections configured as both a host interface and as a device interface. In accordance with the embodiment illustrated in FIG. 6, hybrid controller 600 may have multiple additional interface controllers. Hybrid controller 600 may be coupled to the PC host through first interface controller 110, to an external device 140 through buffer manager 610, and to a memory device 150 through memory controller 130. Hybrid controller 600 may also have a second interface controller 310 (e.g., configured as a host) to couple hybrid controller 600 to a second hybrid controller 400(*b*) via interface controller 110 (*b*) (e.g., configured as a device). Additionally, hybrid controller 600 may have a third interface controller 510 configured as a device to couple hybrid controller 600 to a PC host.

Figure 7:
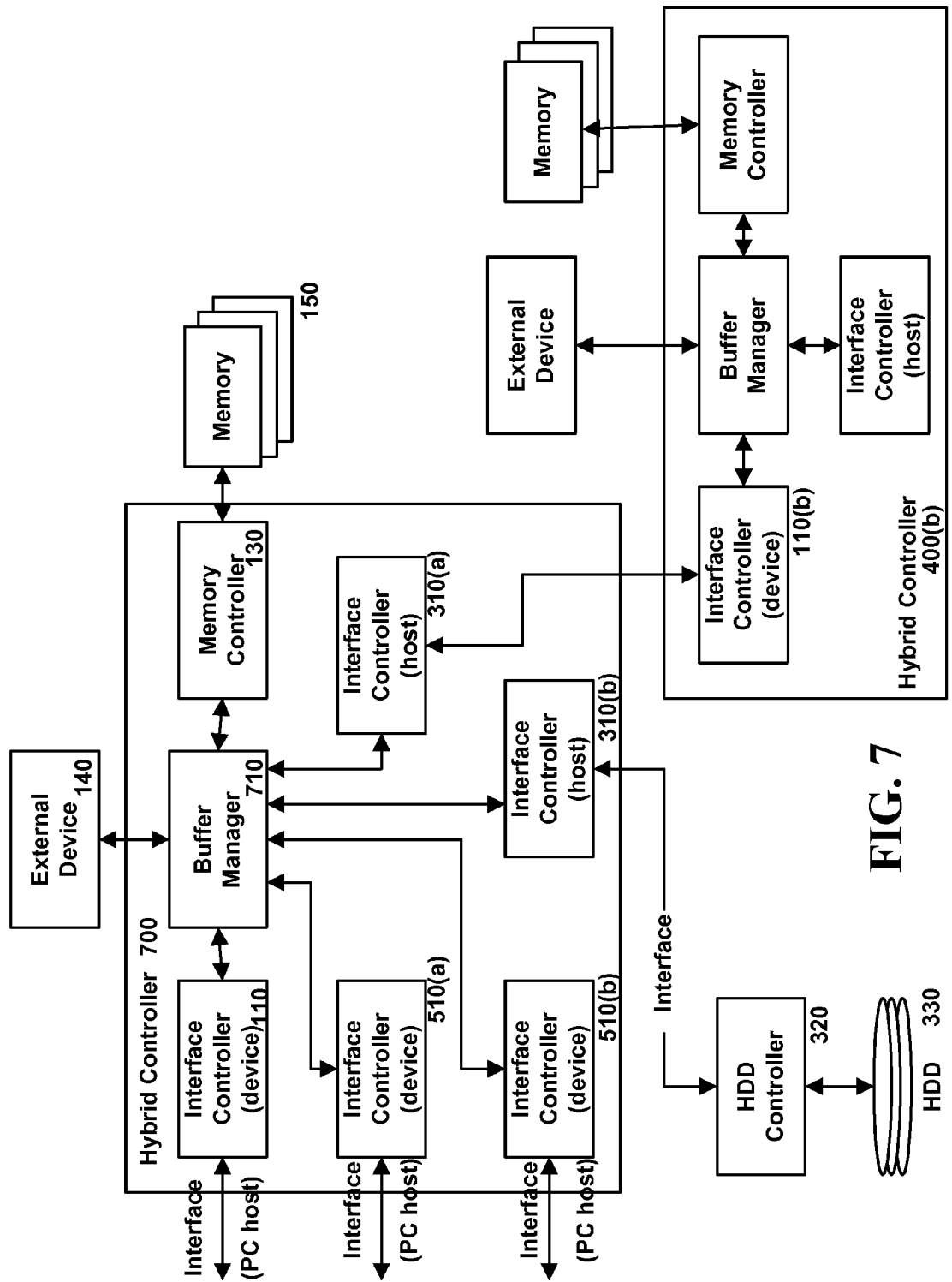
FIG. 7 shows one embodiment of a hybrid controller having multiple serial connections.

In accordance with one aspect of the present invention, the number and type of interface controllers that may be included in a hybrid controller may be limited in some instances by the capacity of the buffer manager 610 to add further clients to its arbitration routines and to the physical space (i.e., chip "real estate") available to include additional interfaces, registers, or other hardware elements on the controller. FIG. 7 shows one embodiment of a hybrid controller having multiple serial connections. In this configuration, hybrid controller 700 may be coupled to a PC host through first interface controller 110 and interface controllers 510(*a*) and 510(*b*), each of which may be configured as a device. As with the embodiments discussed above, hybrid controller 700 may be coupled to an external device 140 through buffer manager 710 and a memory device 150 through memory controller 130. A second hybrid controller 400(*b*) may be coupled to hybrid controller 700 through interface controller 110(*b*) configured as a device and interface controller 310(*a*) configured as a host. Hybrid controller 700 may further be connected to an HDD controller 320 coupling the hybrid controller 700 to a hard disk drive 330 through interface controller 310(*b*) configured as a host.

Figure 8:
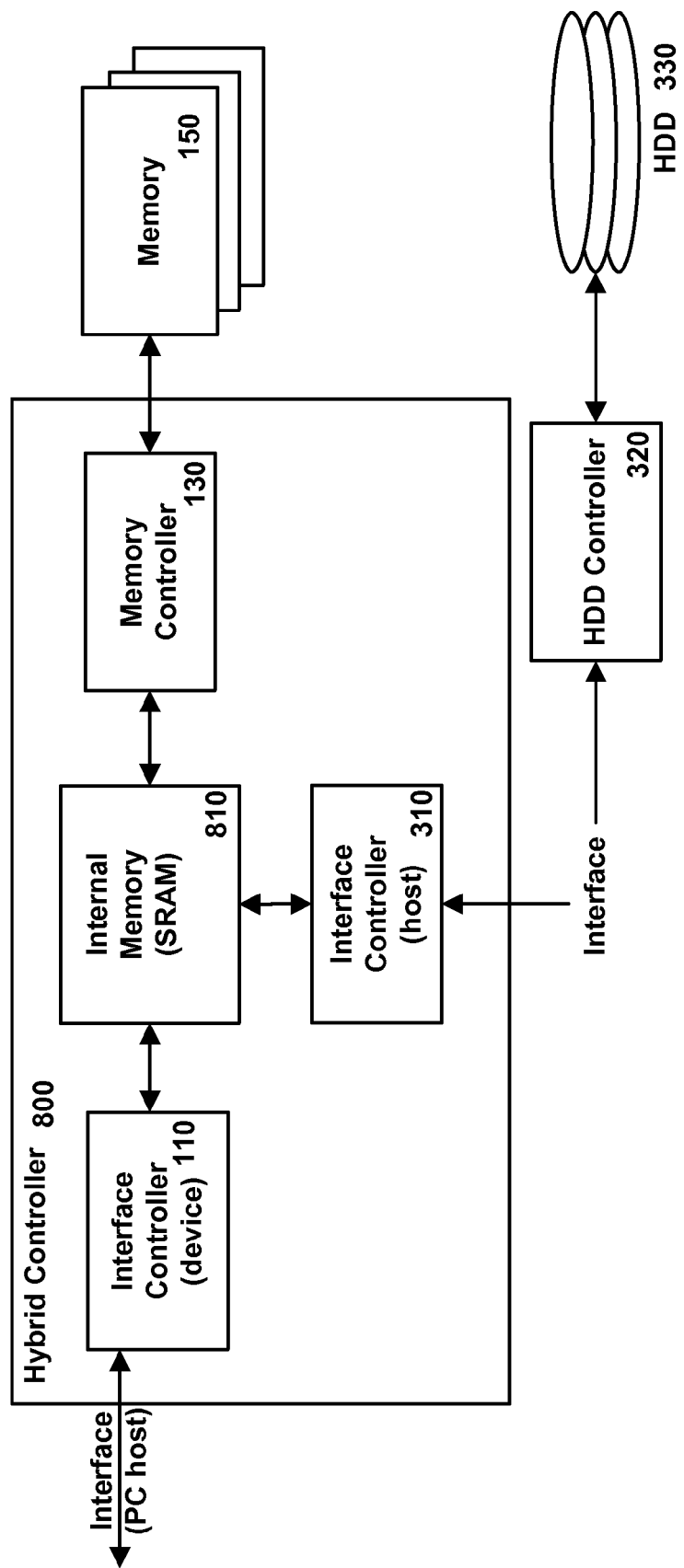
FIG. 8 shows one embodiments of a hybrid controller with an internal memory.

FIG. 8 shows one embodiment of a hybrid controller with an internal memory. In this configuration, hybrid controller 800 may have an internal memory 810 instead of a separate buffer manager coupled to an external device.

For each of the embodiments described above with reference to FIGS. 3-8, the interface controllers (e.g., the first interface controller 110 and the second interface controller 310) are primarily described as conforming to the SATA standard. However, any suitable interface and interface controller that can manage the connection between the hybrid controller and the coupled controllers or hosts may be used.

In that regard, it will be appreciated that the foregoing inventive concepts are not intended to be limited to any particular interface hardware or inter-device communications protocol. For example, the interfaces set forth above may be operative in accordance with SCSI, SAS, or other protocols that are generally known or developed in accordance with known principles.

Figure 9:
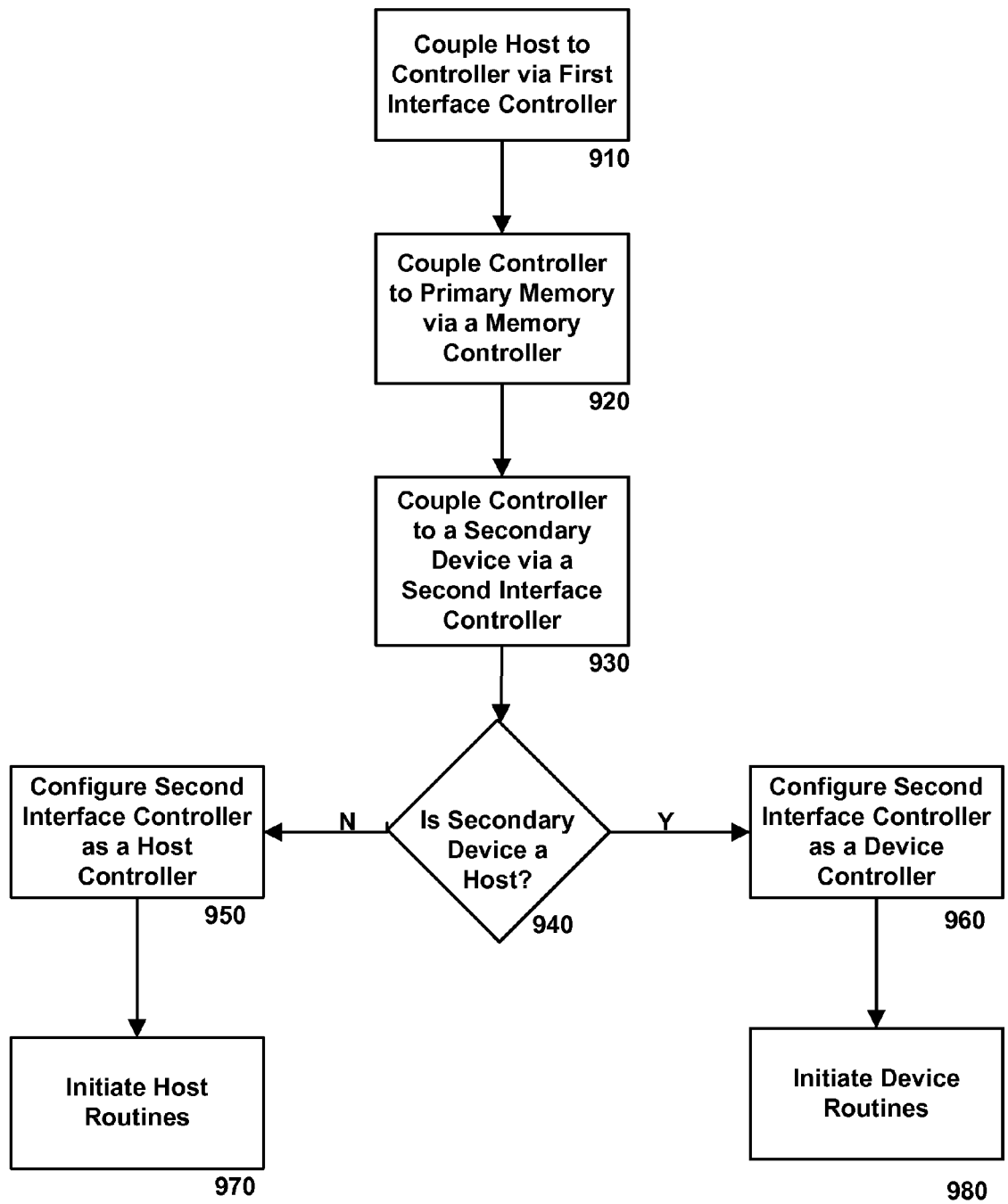
FIG. 9 is a simplified flow diagram illustrating general operation of one embodiment of a method of coupling a PC host to multiple memory devices.

FIG. 9 shows a simplified flow diagram illustrating the general operation of one embodiment of a method of coupling a PC host to multiple memory devices via a hybrid controller. To couple a PC host to both a primary memory and a secondary device, a hybrid controller may manage multiple interfaces. At block 910, a PC host may be coupled to a hybrid controller. Coupling the PC host and the hybrid controller may be implemented with a first interface controller. The interface between the hybrid controller and the PC host may be managed with the first interface controller. The coupling of the PC host and the hybrid controller may be performed using any suitable interface and interface controller that can manage the connection between the hybrid controller and the PC host.

At block 920, a primary memory may be coupled to the hybrid controller. Coupling the primary memory and the hybrid controller may be implemented with a memory interface controller. The interface between the hybrid controller and the primary memory may be managed by the memory interface controller, for example an interface coupling the hybrid controller to a flash memory device may be managed by a flash controller. Coupling both the PC host and the primary memory to the hybrid controller may allow the exchange of data between the two devices. The primary memory may be any type of external memory, including a variation of DRAM, static RAM (SRAM), synchronous DRAM (SDRAM), and Flash memory, or a mass storage memory device, including a hard disk drive or a solid-state drive.

At block 930, a secondary device may be coupled to the hybrid controller. Coupling the secondary device and the hybrid controller may be implemented with a second interface controller. The interface between the hybrid controller and the secondary device may be managed by the second interface controller. The coupling of the secondary device and the hybrid controller may be performed using any suitable interface and interface controller that can manage the connection between the hybrid controller and the secondary device. The secondary device may function as a host or as a device.

At decision block 940, the type of secondary device coupled to the hybrid controller may be determined. If the secondary device functions as a device, then the second interface controller may be configured as a host controller at block 950. In some embodiments, the secondary device may function as a device where the secondary device is a device controller. A device controller may manage a memory device, for example an HDD controller managing an HDD or a flash controller managing a flash memory device. In some embodiments, a device controller may be another hybrid controller. Configuring the second interface controller as a host may suggest that the second interface controller can initiate the exchange of data between the second interface controller and the secondary device. At block 970, the configuration of the second interface controller may be completed by initiating the host routines in the second interface controller. In some embodiments, configuring the second interface controller in accordance with the determination at decision block 940 may include setting registers or other programmable hardware elements.

If the secondary device functions as a host, then the second interface controller may be configured as a device at block 960. In some embodiments, a secondary device that functions as a host may be another PC host. Configuring the second interface controller as a device may suggest that the second interface controller can respond to requests to exchange data between the second interface controller and the secondary device. At block 980, the configuration of the second interface controller may be completed by initiating the device routines in the second interface controller. As noted above, the configuring operation at block 960 may include programming hardware registers or other components. Coupling a PC host, a primary memory and a secondary device to the hybrid controller may allow the exchange of data between any of the devices.

Where the second interface controller is configurable as a host controller or as a device controller, it will be appreciated that enabling selective configuration of the second interface controller may provide options for the timing and manner of the determination at decision block 940. Such determination may be based on the type of secondary device coupled to the second interface controller. Alternatively, for example, the determination may be made at an earlier or later operation if selection of the desired configuration is based on the requirements of the end user.

It is noted that the arrangement of the blocks in FIG. 9 does not necessarily imply a particular order or sequence of events, nor is it intended to exclude other possibilities. For example, the operations depicted at 910, 920, 930 and 950 or 960 may occur substantially simultaneously with each other; similarly, the determination made at decision block 940 may be incorporated in an earlier operation, or may be eliminated in some instances.

While the invention has been described in detail above with reference to some embodiments, alternative implementations and various modifications within the scope of the present disclosure will be apparent to those of ordinary skill in the art. Therefore, the invention should be considered as limited only by the scope of the appended claims.

What is claimed is:

1. A first storage controller, comprising:
 a first memory controller configured to control a connection between i) the first storage controller and ii) a first storage device;
 a first interface controller configured as a device, the first interface controller configured to control a connection between i) the first storage controller and ii) a first host;
 a second interface controller configurable to function as a host or a device, wherein the second interface controller is further configured to
  i) control a connection between the first storage controller and a secondary device,
  ii) function as a host when the secondary device is a second storage controller, and
  iii) function as a device when the secondary device is a second host.

2. The first storage controller of claim 1, wherein:
 the first interface controller, the second interface controller, and the first memory controller are located on a system on a chip; and
 the first host, the first storage device, and the secondary device are external to the system on a chip.

3. The first storage controller of claim 1, wherein the first storage device includes at least one of a solid state drive, a hard disk drive, and a flash storage device.

4. The first storage controller of claim 1, wherein at least one of the first interface controller, the second interface controller, and the first memory controller includes a Serial Advanced Technology Attachment (SATA) interface.

5. The first storage controller of claim 1, wherein data is communicated from the first host to the second storage controller via the first interface controller and the second interface controller, and from the first host to the first storage device via the first interface controller and the first memory controller.

6. The first storage controller of claim 1, further comprising a buffer manager configured to arbitrate data access by the first host via the first interface controller and the second interface controller.

7. The first storage controller of claim 1, further comprising a third interface controller configurable to function as a host and configurable to function as a device.

8. A system comprising the first storage controller of claim 1, and further comprising:
 the second storage controller, the second storage controller including a third interface controller configured as a device, the third interface controller configured to control a connection between the first storage controller and the second storage controller.

9. The system of claim 8, wherein the second storage controller includes:
 a second memory controller configured to control a connection between the second storage controller and a second storage device; and
 a fourth interface controller configurable to function as a host and configurable to function as a device.

10. A method for operating a first storage controller, the method comprising:
 configuring a first interface controller as a device;
 using the first interface controller, controlling a connection between the first storage controller and a first host;
 using a first memory controller, controlling a connection between the first storage controller and a first storage device;
 configuring a second interface controller to i) function as a host, and ii) control a connection between the first storage controller and a secondary device when the secondary device is a second storage controller; and
 configuring the second interface controller to function as a device when the secondary device is a second host.

11. The method of claim 10, further comprising arranging the first interface controller, the second interface controller, and the first memory controller on a system on a chip, wherein the first host, the first storage device, and the secondary device are external to the system on a chip.

12. The method of claim 10, wherein the first storage device includes at least one of a solid state drive, a hard disk drive, and a flash storage device.

13. The method of claim 10, wherein at least one of the first interface controller, the second interface controller, and the first memory controller includes a Serial Advanced Technology Attachment (SATA) interface.

14. The method of claim 10, further comprising:
 communicating data from the first host to the second storage controller via the first interface controller and the second interface controller; and
 communicating data from the first host to the first storage device via the first interface controller and the first memory controller.

15. The method of claim 10, further comprising arbitrating data access by the first host via the first interface controller and the second interface controller.

16. The method of claim 10, further comprising configuring a third interface controller to function as one of a host and a device.

17. The method of claim 10, further comprising:
 configuring a third interface controller, located on the second storage controller, as a device; and
 using the third interface controller, controlling a connection between the first storage controller and the second storage controller.

18. The method of claim 17, further comprising:
 configuring a second memory controller, located on the second storage controller, to control a connection between the second storage controller and a second storage device; and
 configuring a fourth interface controller, located on the second storage controller, to function as one of a host and a device.

* * * * *